Dec. 12, 1967  J. CADIOU  3,357,718
LONGITUDINAL-ELASTICITY WHEEL MOUNTING OF VEHICLE
Filed Sept. 14, 1965  5 Sheets-Sheet 1

Dec. 12, 1967 J. CADIOU 3,357,718
LONGITUDINAL-ELASTICITY WHEEL MOUNTING OF VEHICLE
Filed Sept. 14, 1965 5 Sheets-Sheet 3

Dec. 12, 1967   J. CADIOU   3,357,718
LONGITUDINAL-ELASTICITY WHEEL MOUNTING OF VEHICLE
Filed Sept. 14, 1965   5 Sheets-Sheet 5
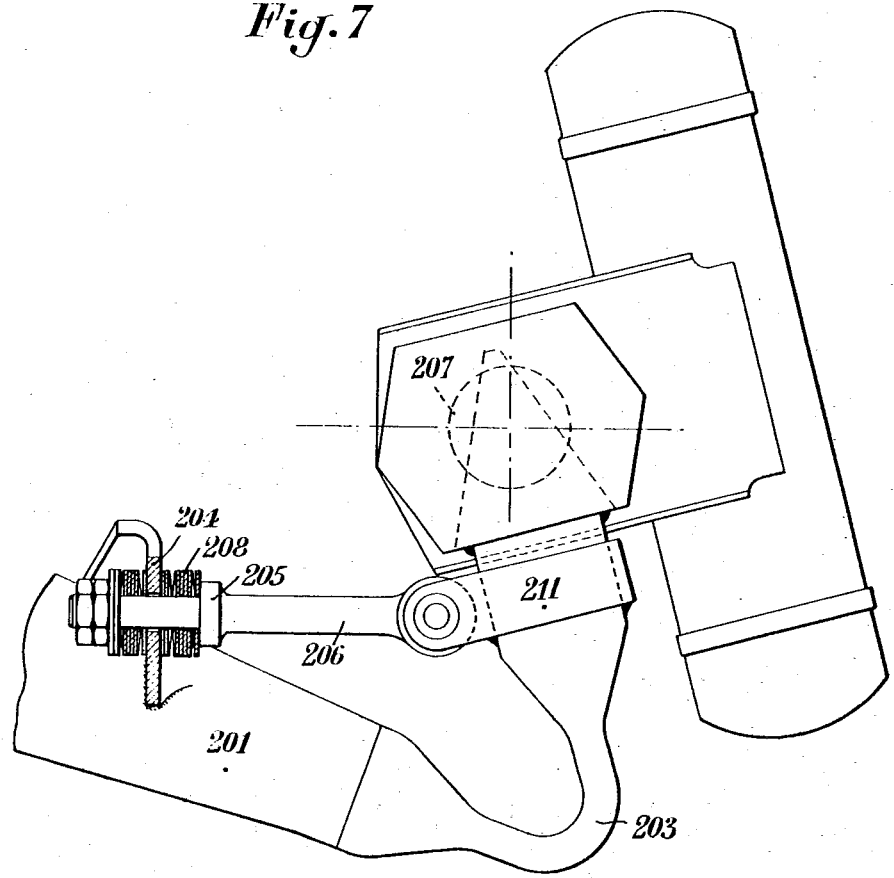

United States Patent Office 3,357,718
Patented Dec. 12, 1967

3,357,718
LONGITUDINAL-ELASTICITY WHEEL MOUNTING OF VEHICLE
Jean Cadiou, Paris, France, assignor to Societe Anonyme Andre Citroen, Paris, France, a French company
Filed Sept. 14, 1965, Ser. No. 487,224
Claims priority, application France, Sept. 21, 1964, 988,769, Patent 1,416,471
5 Claims. (Cl. 280—96.1)

ABSTRACT OF THE DISCLOSURE

A wheel mounting for automotive vehicle wherein the wheel is mounted to the end of a support transmitting the vertical movements of the suspension concurrently with positive connecting means permitting only the longitudinal movements of the wheel with respect to the end of said support and by elastic connecting means having predetermined characteristics such that the longitudinal vibration likely to be imparted to the wheel by the action of said elastic connecting means alone have the same frequency as the longitudinal impulses impressed to the wheels by road unevennesses.

---

In a prior U.S. Patent No. 3,089,558 the applicant already described means capable of damping out vibration or noise due to short-periodicity deformations to which tires are subjected when driving on uneven roads or grounds.

The method applied to this end consists in providing a relatively considerable mass by connecting an axle to the engine and associating with this mass an elasticity of relatively high modulus with a view to obtain a system having a frequency of its own which is of the same order as that of the vibration to be absorbed.

It is the essential object of this invention to effect this damping in the case of light vehicles, notably in the case of vehicles equipped with independent wheel suspension systems.

In this case it is no more possible to provide as in heavy vehicles an assembly constituting a relatively considerable mass, but nevertheless it is still possible to associate, with the mass of the wheel equipped with its tire and hub, a certain elasticity constituting with said mass a system adapted to vibrate in the frequency range to be damped out.

The assembly according to the present invention for damping out longitudinal vibration in the wheel of a relatively light vehicle consists in mounting the stub axle support or the support itself on the vehicle frame while interposing therebetween a member having a certain elasticity in the longitudinal direction, and in so determining the nature of this elastic member that the inherent vibration which it tends to impart to the associated wheel have the same frequency as the vibration to be absorbed.

The characteristic features and advantages of this invention will appear more completely from the following description, given by way of example with reference to the accompanying drawings, of typical forms of embodiment of this invention. In the drawings:

FIGURE 7 shows in side elevational view a third form of embodiment in which the desired longitudinal elasticity is derived at least partially from a suitable configuration of the wheel support.

Figure 1:
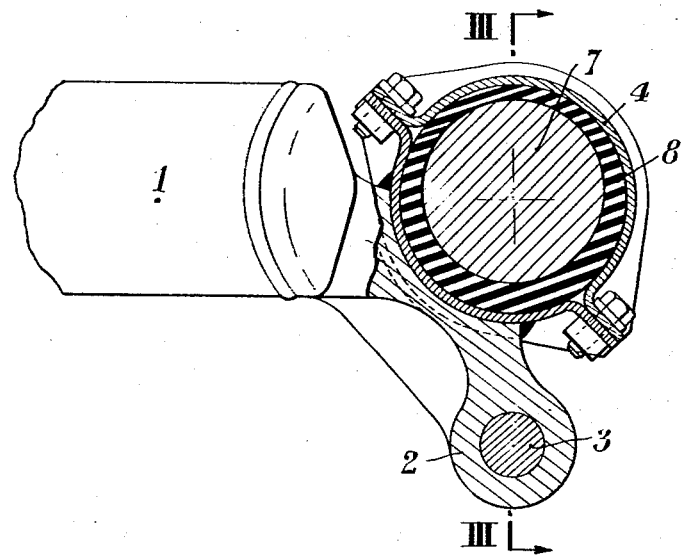
FIGURES 1, 2 and 3 illustrate a first form of embodiment of a wheel mounting, respectively in vertical section taken upon the line I—I of FIGURE 2, in plan view with details shown in vertical section, and in section taken upon the line III—III of FIGURE 1.
Figure 2:
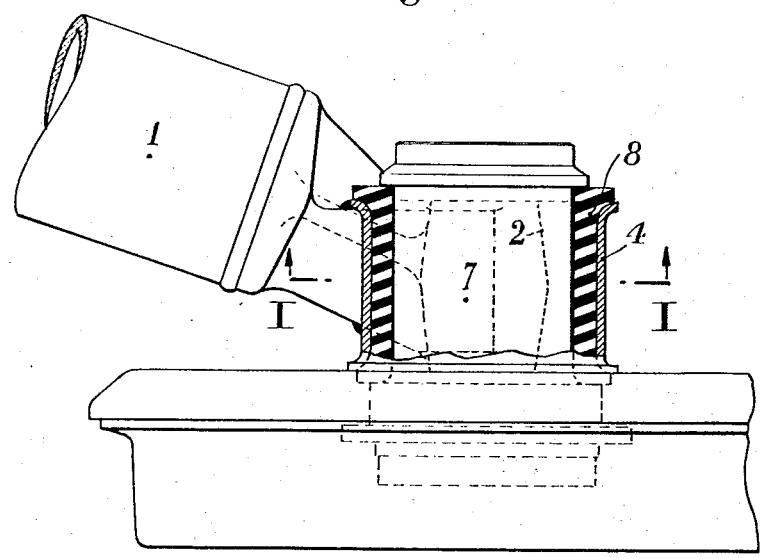
Figure 3:
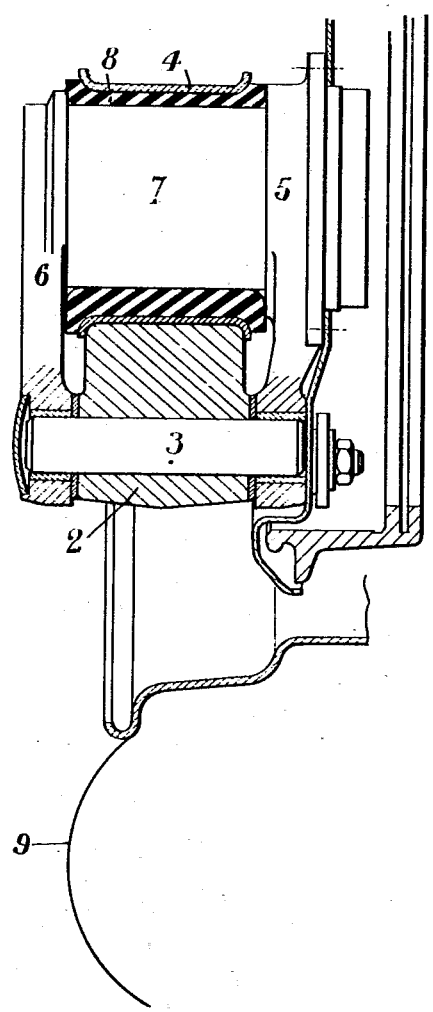

In the form of embodiment illustrated in FIGURES 1 to 3 inclusive the wheel 9 is carried by a wheel support arm or carrier member 1 suspended in any suitable and known manner so that its wheel-supporting end oscillates in a substantially vertical plane. A pivot pin 3 extends horizontally through the end 2 of this wheel support and projects laterally therefrom to constitute a pair of trunnions, this support further carrying a flanged collar 4 having its inner face lined with an elastic sleeve 8. Pivoted on the trunnions of pin 3 are a pair of flanges 5 and 6 between which the inner base or extension of the wheel stub axle 7 is mounted. The pin 3 is normally disposed somewhat beneath the collar 4, whereby the vertical suspension beats are exactly transmitted by this collar to the inner base or extension of the wheeel stub axle 7. In the horizontal direction, the inner base or extension of the wheel stub axle 7 can oscillate in said collar against the elastic resistance of sleeve 8 of which the nature and dimensions are determined with a view to damp out the longitudinal vibrations to which the wheel is usually subjected on account of road unevennesses.

The inner cylindrical wall of sleeve 8 may be somewhat eccentric in relation to its outer cylindrical wall engaged in said collar 4, as illustrated in the drawings, whereby the sleeve 8 will have in the different directions the thickness consistent with the vibrations to be damped out.

Figure 4:
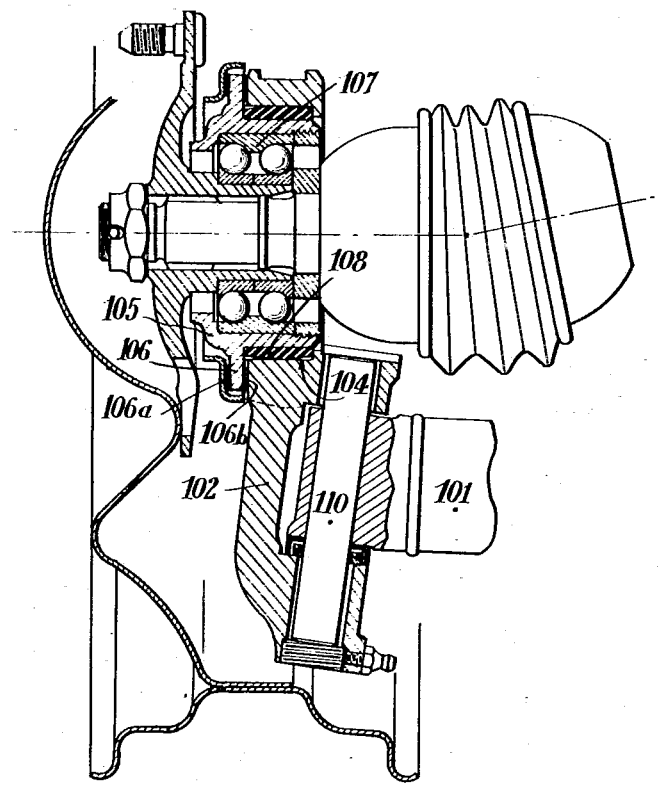
FIGURES 4, 5 and 6 are other views showing another form of embodiment in the case of a front wheel, respectively in axial vertical section, in side elevational view and in fragmentary detail section.
Figure 6:
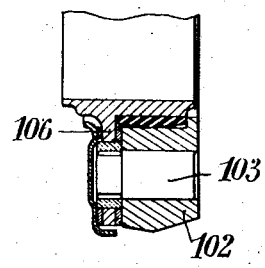
Figure 5:
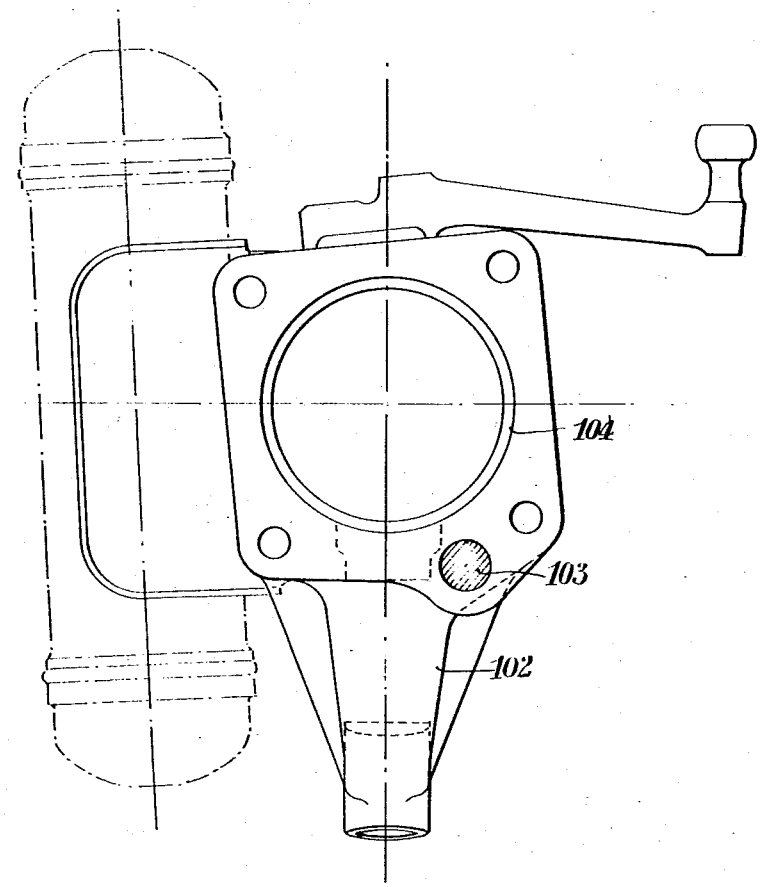

The form of embodiment illustrated in FIGURES 4, 5 and 6 applies to the mounting of a front or steering wheel wherein the end 102 of wheel support arm or carrier member 101 is pivotally mounted on a pin 110. This end 102 of the wheel support receives therethrough a pin 103 and has formed above this pin a bore 104 lined internally with a resilient sleeve 108. The pin 103 has pivotally mounted thereon a ball-bearing comprising at its periphery annular member 105 engaging the sleeve 108 of bore 104, this annular member 105 having mounted therein by means of a set of balls 107 the wheel stub axle. The annular member 105 has formed on its outer periphery a guide flange 106 which if desired may be provided on either side with linings 106a and 106b acting as friction-type shock absorbing means.

In the alternate form of embodiment illustrated in FIGURE 7, the movable connection between the wheel carrier arm 201 and the wheel stub axle support 207 consists of a thinner, flexible portion 203 of said support which acts at the same time as the elastic element of the assembly. In the construction illustrated this flexible porion 203 is bent upwards whereby its elasticity is applied to the horizontal movements of the wheel stub axle support 207 which are the movements to be damped out. Besides, this arrangement is not compulsory. If desired, the portion 203 may be simply reduced in thickness instead of being bent, and its elasticity may be exploited by means of a perpendicular transmission arm. The elasticity of the thinner portion 203 constituting the flexion zone may be completed, if desired, by an elasticity 208 acting between an abutment surface 204 rigid with the wheel carrier arm 201 and a member 205 attached by means of a rod 206 and a swivel collar 211 to the wheel stub-axle support 207.

What I claim is:

1. Wheel mounting notably for automotive vehicle, which comprises a wheel support having one end portion responsive to the vertical movements permitted by a suspension system, a cylindrical cavity formed in said end portion, a sleeve of elastic material fitted in said cylindrical cavity, an axial element, said wheel being mounted for coaxial rotation in relation to said axial element, said axial element being fitted in said elastic sleeve and carrying at least one rigid radial extension, a pin extending through said wheel support end portion and said radial extension, and having its axis parallel and substantially in the same vertical plane as the axis of said cylindrical cavity, the characteristics of elastic material of said sleeve being so calculated that the longitudinal vibrations which the wheel can perform under the action of this elastic element alone have the same frequency as the longitudinal impulses applied to the wheel by the road unevennesses.

2. Wheel mounting as set forth in claim 1, wherein said axial element having the wheel mounted in coaxial rotational relationship is a solid stub axle on which said wheel is rotatably mounted.

3. Wheel mounting as set forth in claim 2, wherein said axial element having the wheel mounted in coaxial rotational relationship is a ball-bearing in which said wheel is rotatably mounted.

4. Wheel mounting as set forth in claim 3, wherein said ball-bearing is provided with a flange and comprising a pair of friction washers between which said flange is clamped.

5. Front-wheel mounting as set forth in claim 4 in which the wheel support and its end portion have formed therethrough cylindrical coaxial passages and a spindle extending through said coaxial passages for pivotally connecting the end portion of said wheel support to said wheel support.

References Cited

UNITED STATES PATENTS 2,998,262   8/1961   Hoffman _____ 280—96.1

BENJAMIN HERSH, *Primary Examiner.*

PHILIP GOODMAN, *Examiner.*